J. H. MUMMA.

Straw Cutter.

No. 1,899.

Reissued March 7, 1865.

Witnesses:
R. T. Campbell
O. Schafer.

Inventor:
Jacob H. Mumma
by his Atty.
Mason, Fenwick & Lawrence.

N. PETERS, Photo-Lithographer, Washington, D. C.

UNITED STATES PATENT OFFICE.

H. K. PARSONS, OF HARRISBURG, PENNSYLVANIA, ASSIGNEE, BY MESNE ASSIGNMENTS, OF JACOB H. MUMMA, OF SAME PLACE.

IMPROVEMENT IN STRAW-CUTTERS.

Specification forming part of Letters Patent No. 19,200, dated January 26, 1859; Reissue No. 808, dated September 6, 1859; Reissue No. 1,648, dated March 29, 1864; Reissue No. 1,899, dated March 7, 1865.

*To all whom it may concern:*

Be it known that I, H. K. PARSONS, of Harrisburg, county of Dauphin, and State of Pennsylvania, have, by assignment duly recorded in the Patent Office, become the sole owner of a patent granted to JACOB H. MUMMA, January 28, 1858, for Improvements in Straw-Cutters, of which said MUMMA is the inventor; and I do hereby declare that the following is a full, clear, and exact description thereof, reference being had to the accompanying drawings, making part of this specification, in which—

Figure 1:
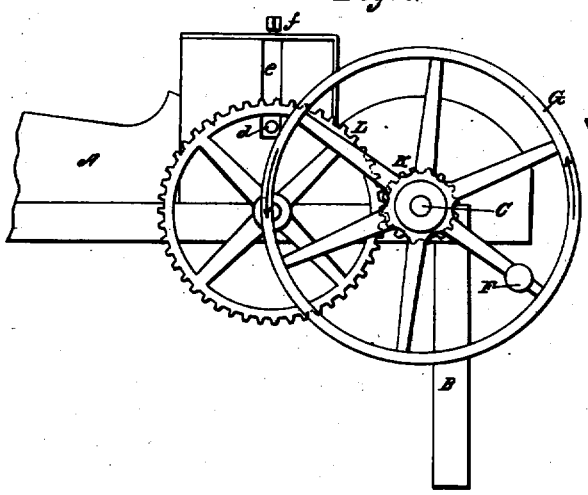
Figure 2:
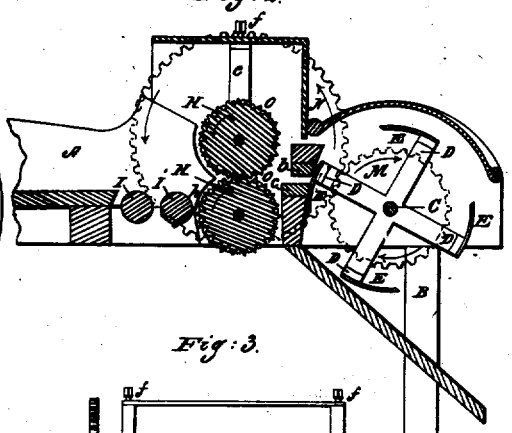
Figure 3:
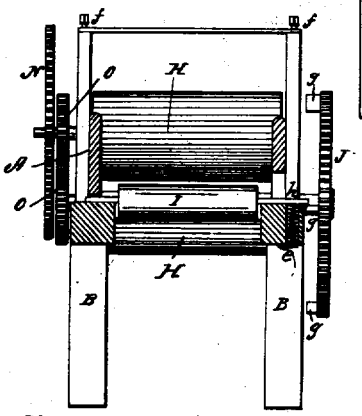

Figure 1 is a side elevation; Fig. 2, a longitudinal vertical section; Fig. 3, a vertical transverse section taken behind the feed-rollers, and Figs. 4, 5, 6, 7, and 8 represent in detail the cutters or knives and the arrangement of the same upon the cylinders or heads.

The object of my invention is to construct a strong and compact machine for crushing and cutting cornstalks, hay, straw, and similar substances.

The prominent feature of my invention consists in knives which are beveled or sharpened from the inside, and which have the whole or a portion of their outer surfaces concentric with the axis on which they revolve.

It further consists in making the knives double-edged, in order that they may cut with equal facility whether the cylinder to which they are attached revolves in a forward or backward direction.

It also further consists in a peculiar arrangement of gearing and other devices to insure the perfect accomplishment of the objects above mentioned.

To enable others skilled in the arts to construct and use my invention, I will proceed to describe its construction and operation.

Figure 4:
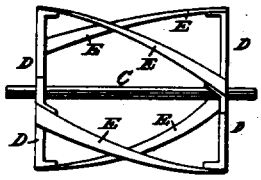

A represents the body of the machine mounted on supports B. At the front end of the machine is mounted a shaft, C, which is provided at each end with a set of arms, D, as shown in Fig. 4, to which the knives E are secured, though it is obvious that instead of the arms cylinder-heads may be used. These knives are of peculiar construction, their edges being formed by beveling or grinding their inner surface instead of the outer, (as is usually the case,) thus forming the cutting-edge on a line with their outer or convex surface, the whole or a portion of said convex surface being so curved as to be concentric with the axis on which they revolve when attached to the arms D, as shown. In all cases the knives E are made and set in a spiral form on the arms or cylinder-heads, for the purpose of producing a gradual and shear cut.

Figure 5:
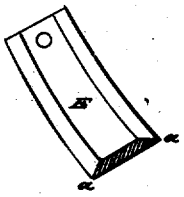
Figure 6:
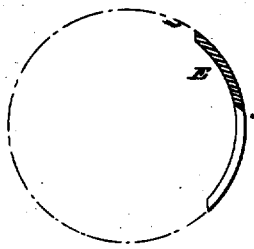
Figure 8:
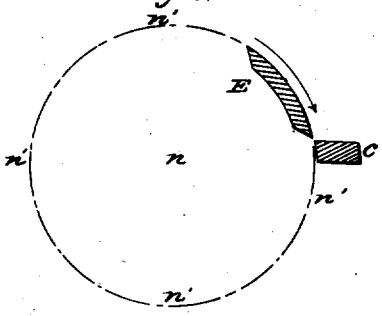

In the drawings these knives are shown concentric on their entire outer surface and as being double-edged—that is, having a cutting-edge both front and rear, as clearly shown in Figs. 5, 6, and 8. While this is the style in which I prefer to make them, for reasons hereinafter set forth, yet it is obvious that other styles or forms may be adopted without departing from the principle involved in my invention. They may be constructed with a single cutting-edge, and where they are intended to be used on a machine which has its cutting-cylinder revolving in one direction only but one edge is absolutely necessary, though the two edges are preferable, for the reason that when one edge becomes dull the knife can be reversed—that is, turned end for end—thus bringing a fresh and sharp edge into operation.

Instead of making the knife with its whole outer surface concentric, as shown, it is obvious that only that portion which is expected to be worn away in the process of cutting and sharpening need be so made, as in all knives, whether single or double edges, there must always be a portion left which cannot be used as a cutting-edge, the knife becoming too narrow and weak for further use as it is gradually worn and ground away. This remaining portion, which may be that included between the red lines in Fig. 5, in the case of double-edged knives, may be made either flat or concave on its outer surface without at all affecting the cutting parts. So, too, in the case of single-edged knives, that portion which is not expected to be used as a cutting-edge at any time during the wear of the knife may have given to it almost any form without in the least interfering with or affecting the cutting-part, the only requisite condition being that it shall not protrude beyond the convex surface of the cutting part, as in that case it would come in contact with the cutter-bar *c* and prevent the operation of the machine. It may be made convex or it may be inclined inward at any angle, and so long as the cutting portion is left concentric the principle and mode of operation is the same.

In all cases where the whole outer surface of the knife is made concentric it will be secured to the arms or heads, as shown in Figs. 2 and 4; but where its rear portion is not provided with a cutting-edge and is not made concentric the knife must be attached tangentially or in such a position as to bring the cutting portion concentric with its axis. By this construction I am enabled to construct a machine in which the edge of the knife shall always revolve in the same circle, thereby always bringing it in the same proximity to the cutter-bar, no matter how much it may be worn away by use or grinding. In all cases where this is not done some means of adjusting the knives in relation to the cutter-bar must be adopted. Either the knives must be adjustable on the cylinder, the cylinder itself with the knives attached be adjustable bodily, or the cutter bar be movable so that it can be adjusted to the cylinder and knives, in order to compensate for the wear of the latter. By my invention no such adjustment is needed.

The cutter-bar, cylinder, and knives may all be firmly fixed in place when the machine is first constructed, and no change or adjustment of either of the parts will ever be required.

H H′ represent two fluted rollers for crushing and feeding the stalks, straw, &c., forward to the cutters. The lower roller has fixed bearings; but the upper one has its bearings *d* so arranged that they can move vertically to permit the rollers to accommodate themselves to the quantity of material passing between them. A rubber spring, *e*, is placed over the movable bearings *d* on each side of the machine, and these springs are held down by set-screws *f*. By these means the roller is allowed to yield more or less, and at the same time can be adjusted as required. These rollers are geared together at one end by means of star-gear, so as to permit their moving to and from each other, and yet be kept in gear so that they shall always revolve together and at uniform speed.

I I′ represent two smaller rollers located in the rear of the lower roller H and having their upper surfaces flush, or nearly so, with the bottom of the body A of the box, the bottom being left open for the purpose, as shown in Fig. 2. The front roller, I, is so arranged in its bearings that the end *h*, which is held down by the spiral spring *l*, may be raised up by the tappets or lugs *g*, projecting from the inner side of wheel L, which is secured to the lower roller H. The object of this arrangement is to give a sudden jar to the material to be cut, whereby the dust and grit adhering to it shall be shaken off before it reaches the cutting-knives, and thus prevent them from being injured thereby.

Figure 7:
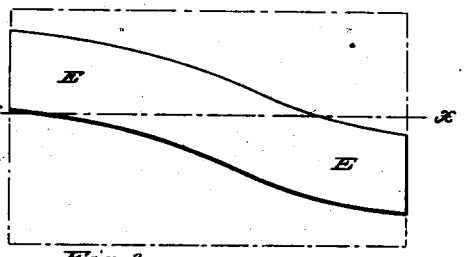

*c* represents a metal bar, upon which the straw or other material rests when being cut, the knives E striking close to its front edge in the same manner that one shear-blade cuts past the other in the operation of cutting with a pair of shears in a case where one blade remains stationary and the other only moves. As the knives are placed spirally upon the cutting-cylinder, as shown in Figs. 4 and 7, it follows that the cutting must commence at one end of the knife first, and proceed from thence to the opposite end in regular order, by which a regular shear-cut is produced. Another cutter-bar, *b*, is located directly over *c*, the space between them forming a throat through which the straw, &c., is forced by the feed-rollers H H′. When the knives are made to revolve in one direction, they will cut down by the bar *e*, but when revolved in the opposite direction, for the purpose of cutting with their other edges, they then cut upward past bar *b*.

In order that the cutting-cylinder may be revolved in either direction and the feed-rollers H H′ at the same time made to revolve uniformly in one direction, so as always to feed the material forward toward the knives, two sets of gearing are provided—one consisting of the balance-wheel G and pinion K, secured to one end of shaft C, the pinion gearing into wheel L, attached to the end of the lower feed-roller H′. When motion is given to the wheel G by means of the handle F, or otherwise, so that it is caused to rotate as indicated by the arrow, it will be seen that the lower roller H′ will revolve in the direction indicated by the arrow in blue and the knives E caused to cut against or past the lower bar, *c*. On the opposite end of C is secured a gear-wheel, M, which gears into another wheel, N, secured to the end of the upper feed-roller H. The wheels K and L being thrown out of gear and M and N being thrown into gear, motion is given to the latter, as indicated by the arrows thereon, which causes the cutting-cylinder to revolve in the opposite direction, and makes the knives E cut upward against or past cutter-bar *b*, the rollers H H′ revolving in the same direction as before, it being observed that in one case the motion is transmitted from the driving-wheel on shaft C to the lower feed-roll H′, and in the other case to the upper feed-roll H, by which means they are made to revolve uniformly in one direction. In order to effect the change in gearing it is only necessary to have the gear-wheels attached to the feed-rollers H H′ so arranged that they can be moved slightly sidewise upon their respective shafts.

It is obvious that the spring *l* may be applied to either of the rolls I, and that either the upper or lower roller H may have its bearings made adjustable in connection with the rubber springs. It is also obvious that the upper cutter-bar, *b*, and one set of gear-wheels may be dispensed with when the cutting-cylinder is required to revolve in one direction only, as is the case when single-edged knives are used, or when double-edged knives are used with the intention of reversing them in their position on the cutting-cylinder or heads.

Having thus described my invention, what I desire to secure by Letters Patent is as follows:

1. A knife for use in straw-cutters, so constructed that its cutting-edge shall be on a line with its outer surface instead of its inner surface, said edge being formed by beveling or grinding the knife from its inner instead of its outer side, and this I claim whether the whole or a portion only of the body of said knife shall form the arc of a circle coincident with axis around which it revolves in the operation of cutting.

2. A knife constructed as above described, and having two under-beveled cutting edges—one at its front and the other at its rear edge.

3. So constructing a knife for straw-cutters, whether single or double edged, that its cutting-edge shall continue to revolve in the same circle when partially worn or ground away as when new, and thus avoid the necessity of adjusting either the knives, the cylinder, or the cutting-bar, as herein set forth.

4. The reversible feed-gear, in combination with double-edged knives, when arranged to operate as herein set forth.

5. The combination of the rubber spring *e* with the feed-rollers H H′, when arranged and operating as herein set forth.

6. Operating the roller I by means of the tappets *g*, as and for the purpose set forth.

H. K. PARSONS,
*Assignee of Jacob H. Mumma.*

Witnesses:
GEO. W. PARSONS,
HENRY GILL.